Sept. 29, 1925.

I. W. TUFTS 1,555,491

EGG BOILER

Filed Oct. 18, 1923     2 Sheets-Sheet 1

WITNESS

INVENTOR
I. W. Tufts,
BY
ATTORNEYS

Sept. 29, 1925.
I. W. TUFTS
1,555,491
EGG BOILER
Filed Oct. 18, 1923 2 Sheets-Sheet 2
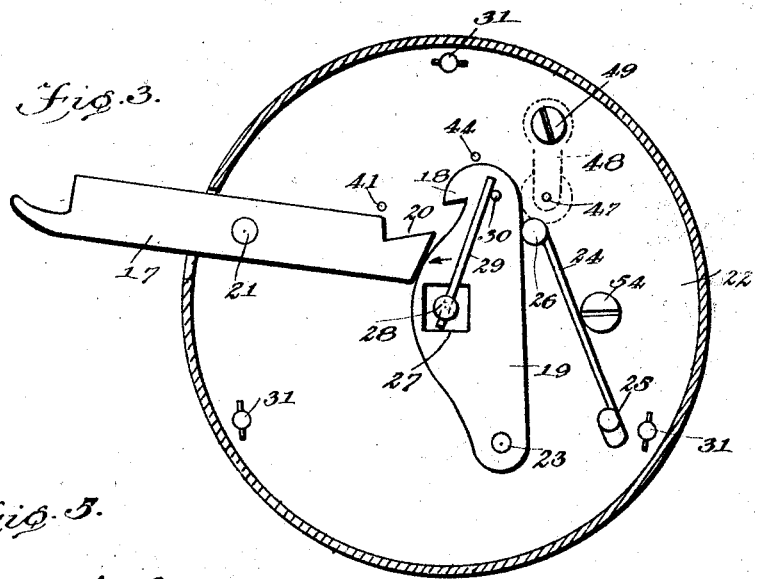
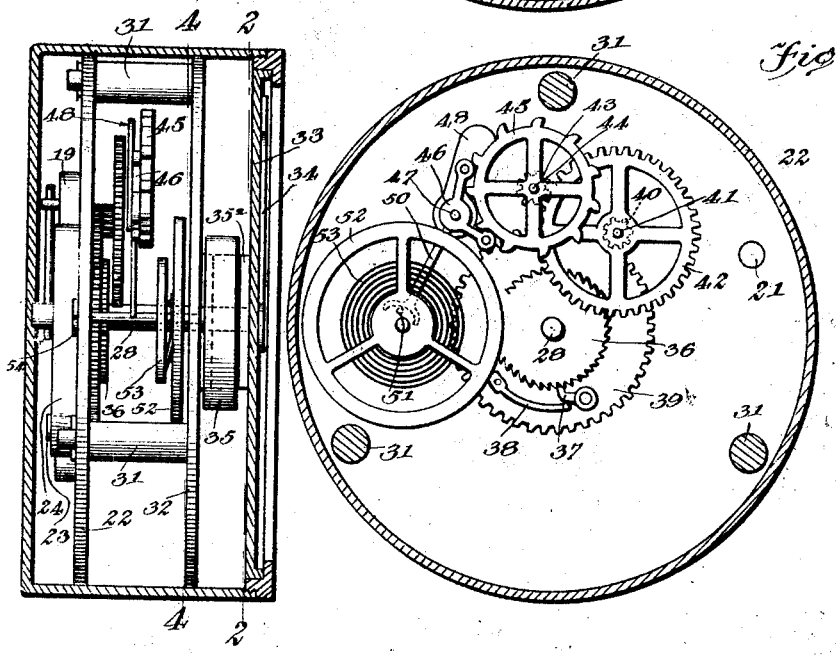
WITNESS
INVENTOR
I. W. Tufts,
BY
ATTORNEYS Patented Sept. 29, 1925.

1,555,491

UNITED STATES PATENT OFFICE.

IRVIN WILLIAM TUFTS, OF NEW ORLEANS, LOUISIANA.

EGG BOILER.

Application filed October 18, 1923. Serial No. 669,341.

*To all whom it may concern:*

Be it known that I, IRVIN W. TUFTS, a citizen of the United States, and a resident of New Orleans, in the parish of Orleans and State of Louisiana, have invented certain new and useful Improvements in Egg Boilers, of which the following is a specification.

This invention relates to egg boilers, and has for its object the provision of a device for automatically regulating the time of immersion of an egg or other article of food in boiling water and in which a pivoted detent cooperates with a catch and chronometric mechanism to release a weight, thereby causing the removal of the articles of food from the influence of the boiling water.

A further object of the invention is the provision of a simple, inexpensive and efficient device for removing eggs from boiling water at a predetermined time, the period of immersion being automatically controlled by a chronometric mechanism.

This invention will be best understood from a consideration of the following detailed description, in view of the accompanying drawing forming a part of the specification; nevertheless it is to be understood that the invention is not confined to the disclosure, being susceptible of such changes and modifications as shall define no material departure from the salient features of the invention as expressed in the appended claims.

In the drawings:

Figure 3 is a rear view of the chronometric mechanism.

Figure 4 is a vertical section taken along the line 4—4 of Figure 5.

Figure 5 is an end view partly in section of the chronometric mechanism.

Figure 1:
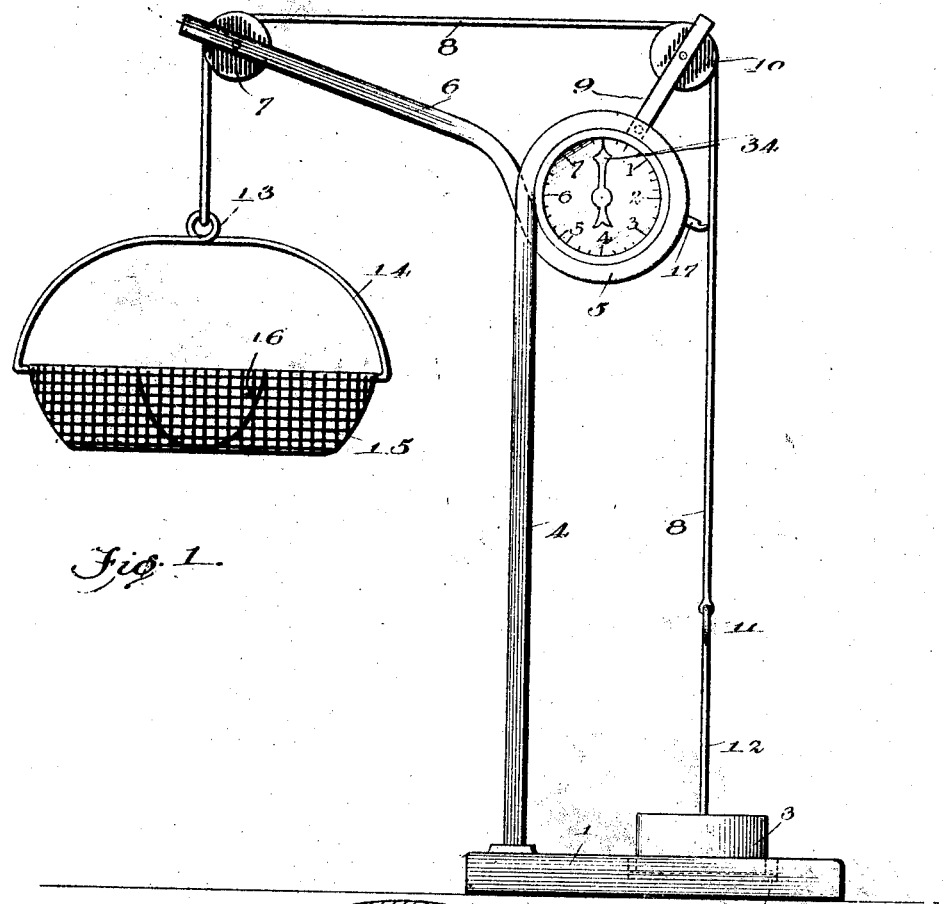
Figure 1 is a side elevation of the egg boiler.
Figure 2:
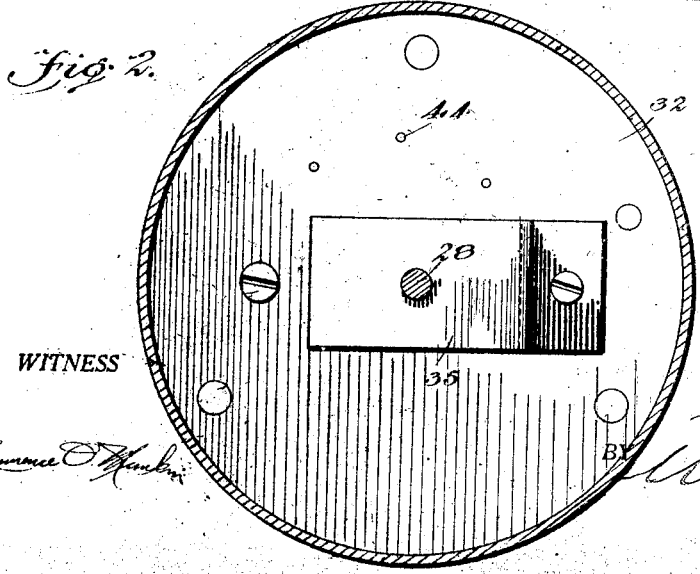
Figure 2 is a vertical section taken along the line 2—2 of Figure 5.

Referring more particularly to the drawings, 1 designates a base plate having a socket 2 adapted to receive a weight 3 and a standard 4 mounted upon the base plate and projecting upwardly and having a coiled portion 5 adapted to embrace the periphery of the chronometric mechanism for supporting the same. An arm 6 projects laterally from the standard 4 and carries a pulley 7 over which a cable 8 is trained. A second arm 9, connected to the coil 5, projects upwardly and upon it is mounted a pulley 10 cooperating with the pulley 7 to carry the cable 8. The lower end of the cable is connected with an eye 11 formed on the upper end of a rod 12, said rod being connected to the weight 3. The opposite end of the cable is connected to an eye 13 of a handle 14 which supports a wire basket 15. The wire basket is provided with a central core 16 in order to maintain the eggs about the periphery of the basket. The basket as is usual is adapted to be immersed in boiling water for cooking the eggs and is adapted to be maintained in an elevated position, even when full of eggs, by the weight 3 when the same is located in the socket 2.

The weight 3 is maintained in elevated position for lowering the basket 15 when the eye 11 is engaged by the detent 17 and the catch 18 of lever 19 is in engagement with the notched end 20 of the detent 17. The detent 17 is pivoted at 21 to the rear plate 22 of the chronometric mechanism while lever 19 is pivoted at 23 to said plate.

A spring 24 mounted at 25 on plate 22 has its upper free end 26 in engagement with the rear of the lever 19 for forcing the lever and likewise the catch 18 into engagement with the notched portion 20 of the detent 17. The lever 19 is provided with an enlarged opening 27 through which the end of the main shaft 28 projects and from which it is free and to which shaft is rigidly secured a rod 29. Said rod is adapted to engage a pin 30 on the lever 19 for moving the lever 19 to the right at predetermined times for forcing catch 18 out of engagement with the notch 20 of the detent 17, this being made possible by the enlarged opening 27 whereby the detent will be slowly oscillated by the weight 3 and lower the outer projecting end of the detent and disengage said detent from the eye 11 connected with said weight. Owing to the particular construction and arrangement of these parts, the basket 15 will not be violently and rapidly jerked from the boiling water.

Spaced from the plate 22 and rigidly secured to the same by means of posts 31 is a circular plate 32, said plate forming the front wall of the chronometric mechanism. The shaft 28 passes through the plate 32 and a bearing is provided for said shaft at this point, the shaft projecting beyond the outer face of plate 32 and through a dial plate 33.

An indicator hand 34 is rigidly secured to the outer projecting end of the shaft 28 and operates over the outer face of the dial plate 33 and over the numbers which indicate the time in minutes for various immersions of the eggs in boiling water.

Connected with the drive shaft 28 is a spring mechanism 35ª in a housing 35 which is adapted to be wound when the indicator hand 34 is moved in a clockwise manner. A ratchet wheel 36 mounted on the shaft is adapted to be engaged by a pawl 37 maintained in engagement with the teeth of the wheel by a spring 38. The pawl and spring are mounted on a gear wheel 39 which is driven by the shaft 28.

Gear 39 meshes with a gear 40 on a shaft 41 whereby not only gear 40 and shaft 41 are driven but a gear 42 is likewise driven since it is rigidly mounted on the shaft 41. Gear 42 is in mesh with a gear 43 carried by a shaft 44. An escapement wheel 45 is mounted on the shaft 44 and driven thereby. A pallet 46 is mounted for oscillation on a pin 47 carried by an adjustable lever 48. The lever 48 is connected to a bearing 49 mounted in the rear face of the plate 22. An arm 50 connected with the pallet lever 46 has a fork at its outer end engageable with an eccentric pin 51 as is usual on a wheel 52. A hair spring 53 is connected with the wheel 52 for maintaining the relative balance of said wheel. An adjustable bearing 54 mounted in the rear plate 22 supports the wheel 52 upon the inner face of said plate.

The operation of my device is as follows:

When the indicator hand 34 is moved in a clockwise manner the spring in the housing 35 is wound and during the unwinding of the spring the chronometric mechanism is set in operation. When the dial hand is moved to any position such as 6 in a clockwise manner, the arm 29 is moved in the direction indicated by the arrow in Figure 3, thereby disengaging the rod 29 from the lug 30 and permitting the spring 24 to force the lever to the left and cause the catch 18 to engage the notched portion 20 of the oscillatory detent 17 and thereby lock the detent in a substantially horizontal position. The weight 3 may be elevated and the eye 11 engaged by the detent 17 whereby the weight is maintained in elevated position with the basket 15 in lowered position and immersed in the boiling water.

The operation of the indicator hand 34 in an anticlockwise direction causes the rod 29 to be moved in a direction opposite to the movement of its setting direction and move into engagement with the pin 30 on lever 19. The spring has sufficient force to cause the rod, which is connected to the shaft 28, to force the catch and lever upwardly and out of engagement with the notched portion 20 of the detent 17. When the tip 18 releases the end 20 of the detent 17, the weight 3 will force the opposite end of detent 17 downwardly and disengage said detent from the eye 11 and permit the weight 3 to descend whereby the basket 15 is elevated and removed from the boiling water. The weight 3 is sufficient to gradually withdraw the basket with its load from the water without causing any sudden jars to discharge the eggs from the basket at the time of release of the eye 11 from the detent 17.

What I claim is:

In an apparatus of the class described, a standard, pulleys arranged thereon, a flexible member trained over the pulleys, a container arranged on one end of the flexible member, a weight carried by the opposite end of said flexible member, an eye carried by the flexible member, an oscillatory detent adapted to engage the eye for supporting the weight in elevated position, an oscillating catch having an enlarged opening intermediate its ends, and adapted to engage the detent and maintain it in a supporting position for the weight, a driven shaft projecting through said enlarged opening of the catch, a spring actuated chronometric mechanism for driving said shaft, an indicator hand mounted at the outer end of said shaft adapted to be set for predetermining the time in minutes the catch engages the detent, a rod connected with the inner end of said shaft and for simultaneous angular rotation with the indicator hand, a lug on the catch adapted to be engaged by the rod for releasing the catch from the detent, and a spring for maintaining the catch in engagement with the detent.

IRVIN WILLIAM TUFTS.